(12) United States Patent
Chang et al.

(10) Patent No.: US 7,930,125 B2
(45) Date of Patent: Apr. 19, 2011

(54) SYSTEM AND METHOD FOR POSITIONING A COORDINATE SYSTEM IN RELATION TO A WORKPIECE ON A MEASUREMENT MACHINE

(75) Inventors: Chih-Kuang Chang, Taipei Hsien (TW); Li Jiang, Shenzhen (CN); Yi-Rong Hong, Shenzhen (CN); Zhong-Kui Yuan, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 205 days.

(21) Appl. No.: 12/346,843

(22) Filed: Dec. 31, 2008

(65) Prior Publication Data

US 2010/0088055 A1    Apr. 8, 2010

(30) Foreign Application Priority Data

Oct. 8, 2008 (CN) .......................... 2008 1 0304769

(51) Int. Cl.
*G01C 17/38* (2006.01)
(52) U.S. Cl. ........................................................ 702/95
(58) Field of Classification Search .................... 702/95; 701/207
See application file for complete search history.

(56) References Cited

U.S. PATENT DOCUMENTS 6,662,103 B1 * 12/2003 Skolnick et al. .............. 701/207
* cited by examiner

*Primary Examiner* — Drew A Dunn
*Assistant Examiner* — Xiuquin Sun
(74) *Attorney, Agent, or Firm* — Frank R. Niranjan

(57) ABSTRACT

A computer-implemented method for positioning a coordinate system in relation to a workpiece receives positioning elements including feature elements selected from the workpiece. A normal vector of a first axis, an origin, a normal vector of a second axis are determined according to the positioning elements. A positioned coordinate system is generated according to the normal vectors of the first axis and the second axis, and the origin, for positioning the coordinate system.

14 Claims, 5 Drawing Sheets

SYSTEM AND METHOD FOR POSITIONING A COORDINATE SYSTEM IN RELATION TO A WORKPIECE ON A MEASUREMENT MACHINE

BACKGROUND

1. Technical Field

Embodiments of the present disclosure generally relate to systems and methods for image measurement, and more particularly, to a system and method for positioning a coordinate system relative to a workpiece.

2. Description of Related Art

Measuring a workpiece using a coordinate system to obtain an accurate measurement may require the workpiece to be precisely placed in relation to the coordinate system being used, for example, at the origin of the coordinate system. If the workpiece is placed improperly, the measurement may not be accurate.

BRIEF DESCRIPTION OF THE DRAWINGS

FIG. 4 comprising FIG. 4(A) and FIG. 4(B) is a flowchart illustrating one embodiment of a method for positioning a coordinate system of a measurement machine in relation to a workpiece placed on the measurement machine

DETAILED DESCRIPTION OF CERTAIN INVENTIVE EMBODIMENTS

Figure 1:
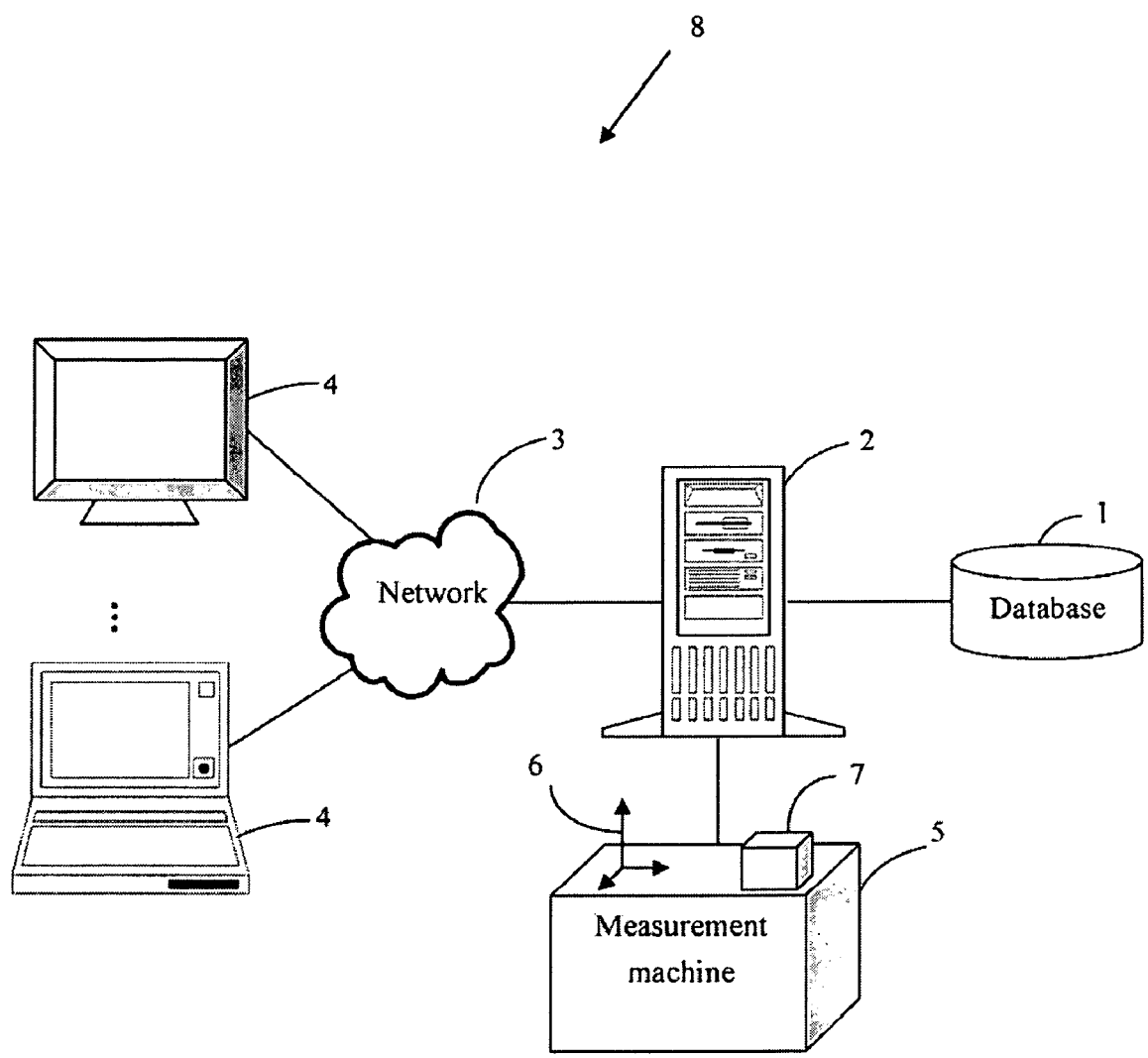
FIG. 1 is a block diagram of one embodiment of a system for positioning a coordinate system of a measurement machine in relation to a workpiece on the measurement machine.

FIG. 1 is a block diagram of one embodiment of a system 8 for positioning a coordinate system 6 in relation to a workpiece 7 on a measurement machine 5. The system 8 includes an application server 2. The application server 2 connects to the measurement machine 5 having the coordinate system 6. The workpiece 7 is placed on the measurement machine 5. The workpiece 7 may be, for example, a mobile phone shell, a mechanical part, and so on. It may be understood that, the system 8 can reposition the coordinate system 6 according to placement of the workpiece 7 (e.g., a position of the workpiece 7) on the measurement machine 5. A database 1 is connected to the application server 2 to store data needed or generated when positioning the coordinate system 6. The application server 2 further connects to at least one client computer 4 (two shown) via a network 3. The network 3 may be the Internet, an intranet, or any other suitable network. The client computer 4 provides a user interface (UI) to display a process of positioning the coordinate system 6 and to output a correctly positioned coordinate system.

Figure 2:
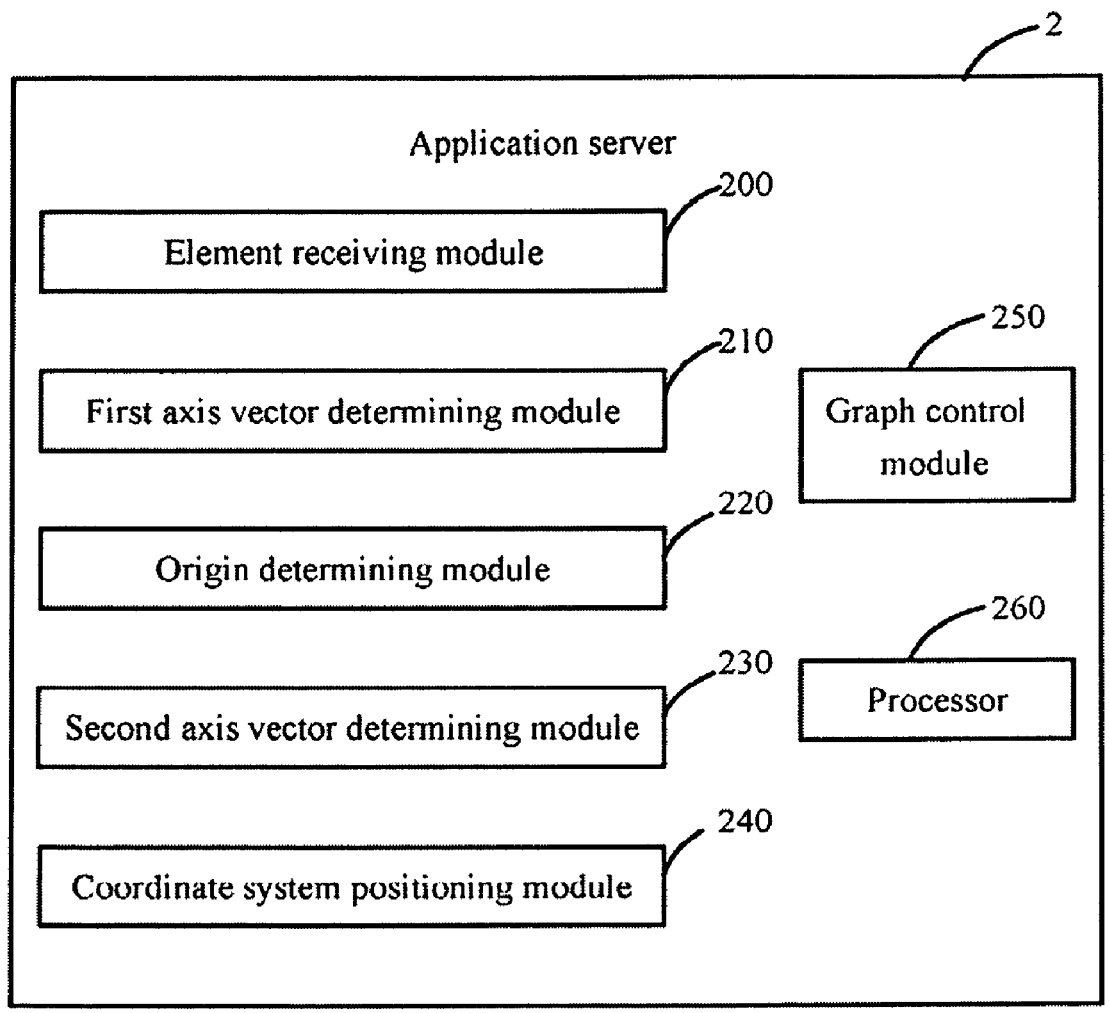
FIG. 2 is a block diagram of one embodiment of function modules of an application server in FIG. 1.

FIG. 2 is a block diagram of one embodiment of function modules of the application server 2 in FIG. 1. In one embodiment, the application server 2 may include an element receiving module 200, a first axis vector determining module 210, an origin determining module 220, a second axis vector determining module 230, a coordinate system positioning module 240, and a graph control module 250.

It may be understood that, one or more specialized or general purpose processors, such as a processor 260 in the application server 2, may be used to execute the function modules 200, 210, 220, 230, and 240.

The element receiving module 200 is configured for receiving positioning elements configured by a user. In one embodiment, the positioning elements may include, for example, the coordinate system 6 that needs to be positioned, a plane positioning element, an origin positioning element, and/or an axis positioning element. The plane positioning element is used to position a first axis of the coordinate system 6, for example, a Z axis of the coordinate system. The origin positioning element is used to position an origin of the coordinate system 6. The axis positioning element is used to position a second axis of the coordinate system 6, for example, an X axis or a Y axis of the coordinate system. In one embodiment, the plane positioning element includes a plane, the origin positioning element includes at least one point, and the axis positioning element may include a plane, a point, a line, a circle, or a sphere. In one embodiment, the point, the line, the plane, the circle, and the sphere may be feature elements selected from the workpiece 7.

The first axis vector determining module 210 is configured for determining a normal vector of a first axis of a positioned coordinate system according to the positioning elements. It may be understood that, the positioned coordinate system is a result of repositioning the coordinate system 6 according to placement of the workpiece 7 on the measurement machine 5. The first axis may be a Z axis of the positioned coordinate system. In one embodiment, if the positioning elements include the plane positioning element, the normal vector of the first axis is a normal vector of a plane included in the plane positioning element. In an alternative embodiment, if the positioning elements do not include the plane positioning element, the normal vector of the first axis is a normal vector of the Z axis of the coordinate system 6.

The origin determining module 220 is configured for determining an origin of the positioned coordinate system according to the positioning elements. It may be understood that, the origin determining module 220 determines the origin of the positioned coordinate system by computing an X coordinate value, a Y coordinate value, and a Z coordinate value of the origin of the positioned coordinate system. In one embodiment, if the positioning elements include the origin positioning element, the origin of the positioned coordinate system is determined according to the origin positioning element. As mentioned above, the origin positioning element includes at least one point. The origin determining module 220 computes the X coordinate value, the Y coordinate value, and/or the Z coordinate value of the origin of the positioned coordinate system using the coordinate values of the at least one point. In an alternative embodiment, if the coordinate elements do not include the origin positioning element, the origin determining module 220 computes the X coordinate value, the Y coordinate value, and/or the Z coordinate value of the origin of the positioned coordinate system using the coordinate values of the origin of the coordinate system 6.

Figure 3:
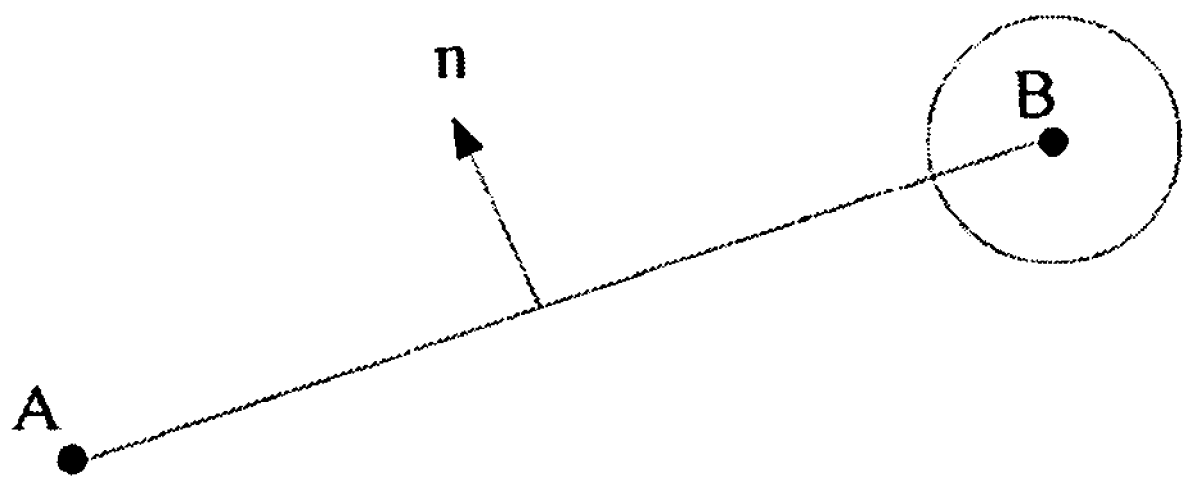
FIG. 3 illustrates determining a normal vector of a second axis of a positioned coordinate system when a axis positioning element is a circle.

The second axis vector determining module 230 is configured for determining a normal vector of a second axis of the positioned coordinate system according to the positioning elements. The second axis may be an X axis or a Y axis. In one embodiment, if the positioning elements include the axis positioning element, and if the axis positioning element is a line, the normal vector of the second axis of the positioned coordinate system is a normal vector of the line. Otherwise, if the axis positioning element is not a line, but a point, a plane, a circle, or a sphere, for example, the normal vector of the second axis is a normal vector of a line composed of a center of the axis positioning element and the origin of the positioned coordinate system. FIG. 3 illustrates the normal vector of the second axis when the axis positioning element is a circle. In FIG. 3, point "A" is the origin of the positioned coordinate system determined by the origin determining module 220, point "B" is the center of the axis positioning element (the circle), and "n" is the normal vector of the line "AB." In an alternative embodiment, if the positioning elements do not include the axis positioning element, the normal vector of the second axis is a normal vector of the X axis or the Y axis of the coordinate system 6.

The coordinate system positioning module 240 is configured for generating the positioned coordinate system according to the normal vector of the first axis, the origin, and the normal vector of the second axis.

The graph control module 250 is configured for loading the positioned coordinate system using Open Graphics Library (OpenGL) and outputting the positioned coordinate system on a screen of the at least one client computer 4.

Figure 4:
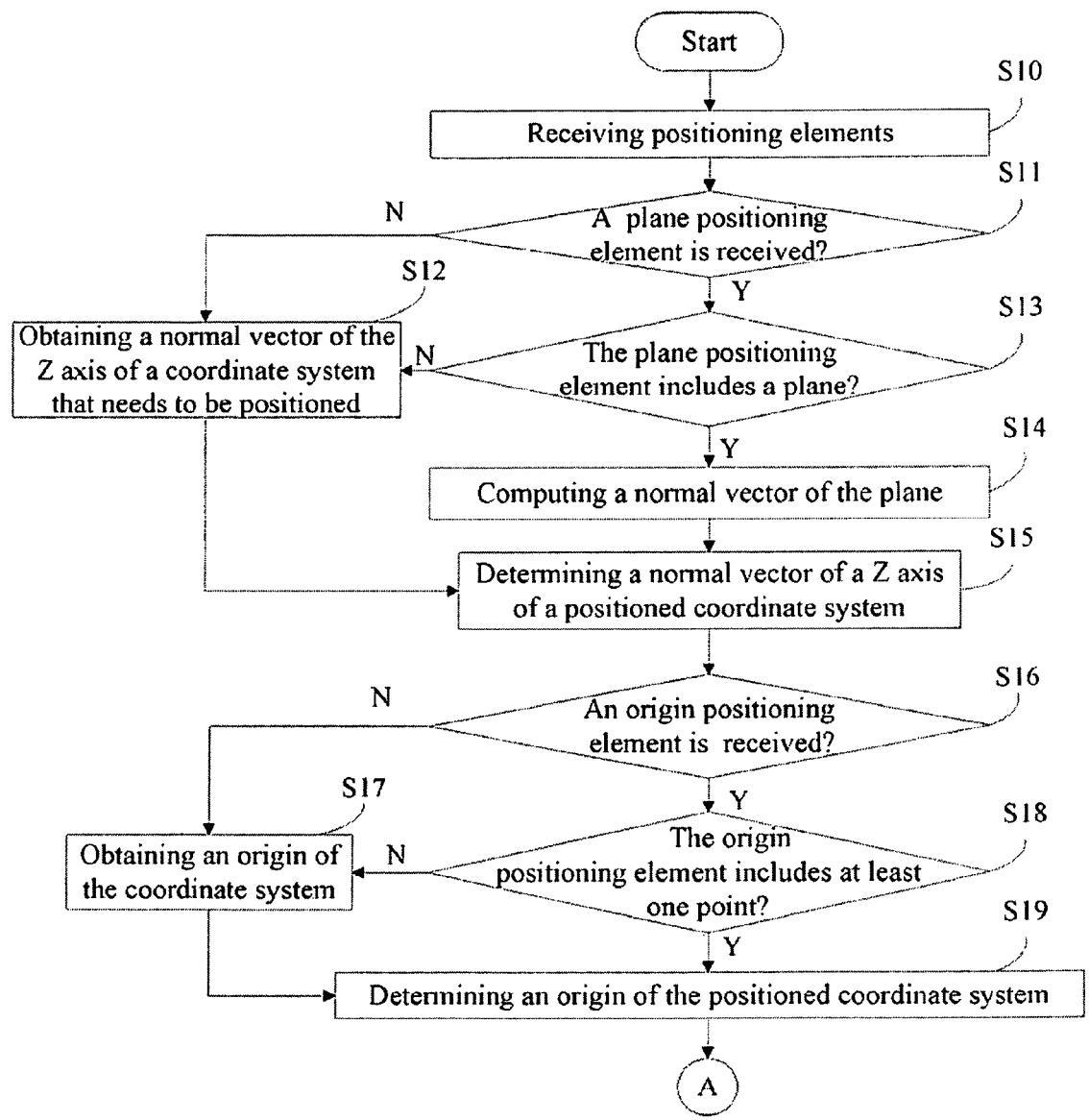
Figure 4:
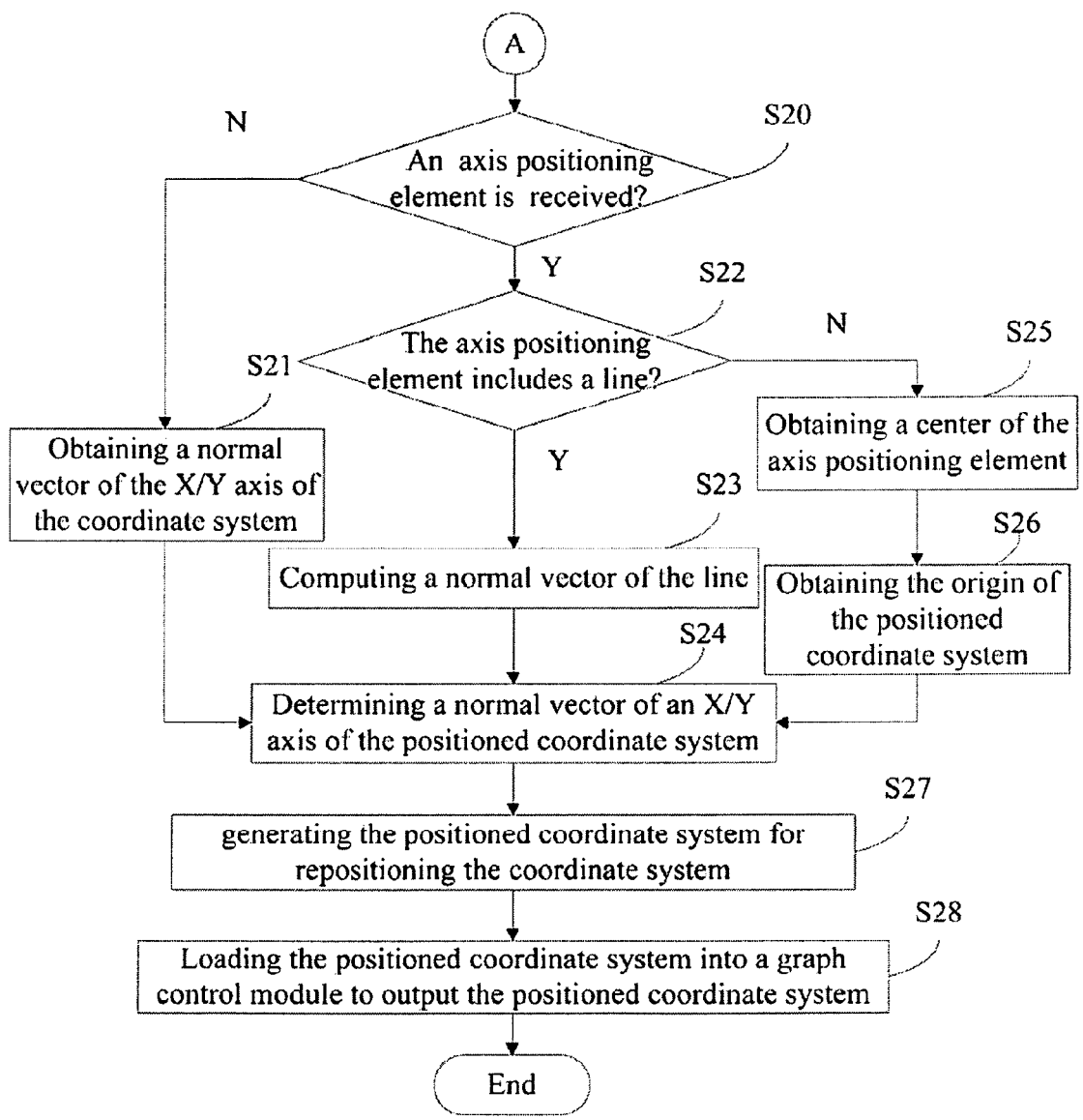

FIG. 4 is a flowchart illustrating one embodiment of a method for positioning the coordinate system 6. Depending on the embodiment, additional blocks in the flow of FIG. 4 may be added, others removed, and the ordering of the blocks may be changed.

In block S10, the element receiving module 200 receives positioning elements configured by a user. As mentioned above, the positioning elements may include, for example, the coordinate system 6 that needs to be positioned, a plane positioning element, an origin positioning element, and/or an axis positioning element. In one embodiment, the plane positioning element includes a plane, the origin positioning element includes at least one point, and the axis positioning element may include a plane, a point, a line, a circle, or a sphere. In one embodiment, the point, the line, the plane, the circle, and the sphere may be feature elements selected from the workpiece 7 that is placed on the measurement machine 5 having the coordinate system 6.

In block S11, the first axis vector determining module 210 determines if the plane positioning element is received. If the plane positioning element is received, the flow will go to block S13. Otherwise, the flow moves to block S12.

In block S12, the first axis vector determining module 210 obtains a normal vector of the Z axis of the coordinate system 6. After block S12, the flow will go to block S15 described below.

In block S13, the first axis vector determining module 210 further determines if the plane positioning element includes a plane. If the plane positioning element does not include a plane, then the flow goes to block S12 described above. Otherwise, if the plane positioning element includes a plane, the flow moves to block S14.

In block S14, the first axis vector determining module 210 computes a normal vector of the plane that included in the plane positioning element.

In block S15, the first axis vector determining module 210 determines a normal vector of a first axis of a positioned coordinate system. It may be understood that, the positioned coordinate system is a result of positioning the coordinate system 6 according to placement of the workpiece 7 on the measurement machine 5. The first axis may be a Z axis of the positioned coordinate system. It may be understood that, in one embodiment, the normal vector of the first axis of the positioned coordinate system is the normal vector of the Z axis of the coordinate system 6 if the plane positioning element is not received or the plane positioning element does not include a plane. In an alternative embodiment, the normal vector of the first axis is the normal vector of the plane that included in the plane positioning element if the plane positioning element includes a plane.

In block S16, the origin determining module 220 determines if the origin positioning element is received. If the origin positioning element is received, the flow will go to block S18. Otherwise, the flow moves to block S17.

In block S17, the origin determining module 220 obtains an origin of the coordinate system 6. It may be understood that, the origin determining module 220 obtains the origin of the coordinate system 6 by obtaining an X, a Y, and a Z coordinate value of the origin of the coordinate system 6.

In block S18, the origin determining module 220 further determines that if the origin positioning element includes at least one point. In one embodiment, the origin positioning element may include three points. The origin determining module 220 may obtain an X coordinate value of the first one of the three points, obtain a Y coordinate value of the second one of the three points, and obtain a Z coordinate value of the third of the three points. In another embodiment, the origin positioning element may include two points. The origin determining module 220 may obtain an X coordinate value of the first one of the two points, obtain a Y coordinate value of the second one of the two points, and obtain a Z coordinate value of the origin of the coordinate system 6. In a third embodiment, the origin positioning element may only include one point. The origin determining module 220 may obtain an X coordinate value of the one point, and obtain a Y coordinate value and a Z coordinate value of the origin of the coordinate system 6.

In block S19, the origin determining module 220 determines an origin of the positioned coordinate system. In one embodiment, the origin of the positioned coordinate system is the origin of the coordinate system if the origin positioning element is not received. In an alternative embodiment, the origin of the positioned coordinate system is a point having the X coordinate value, the Y coordinate value, and the Z coordinate value obtained by the origin determining module 220 if the origin positioning element is received.

In block S20, the second axis vector determining module 230 determines if the axis positioning element is received. If the axis positioning element is received, then the flow will go to block S22. Otherwise, the flow moves to block S21.

In block S21, the second axis vector determining module 230 obtains a normal vector of the X axis or the Y axis of the coordinate system 6. After block S21, the flow will go directly to block S26 described below.

In block S22, the second axis vector determining module 230 further determines if the axis positioning element includes a line. If the axis positioning element includes a line, the flow will go to block S23. Otherwise, the flow moves to block S24.

In block S23, the second axis vector determining module 230 computes a normal vector of the line. After block S23, the flow will go to block S26 described below.

In block S24, the second axis vector determining module 230 obtains a center of the axis positioning element. It may be understood that, if the axis positioning element does not include a line, the axis positioning element may include a point, a plane, a circle, or a sphere, etc.

In block S25, the second axis vector determining module 230 obtains the origin of the positioned coordinate system.

In block S26, the second axis determining module 230 determines a normal vector of an X axis or a normal vector of a Y axis of the positioned coordinate system. In one embodiment, the normal vector of the X axis or the Y axis of the positioned coordinate system may be the normal vector of the X axis or the Y axis of the coordinate system 6 if the axis positioning element is not received. In another embodiment, the normal vector of the X axis or the Y axis of the positioned coordinate system may be the normal vector of the line if the axis positioning element is received, and the axis positioning element includes a line. In a third embodiment, the normal vector of the X axis or the Y axis of the positioned coordinate system may be the normal vector of a line which is composed of the center of the axis positioning element and the origin of the positioned coordinate system if the axis positioning element is received, and the axis positioning element does not include a line.

In block S27, the coordinate system positioning module 240 generates the positioned coordinate system according to the normal vector of the first axis, the origin, and the normal vector of the second axis.

In block S28, the graph control module 250 loads the positioned coordinate system using the OpenGL and outputs the positioned coordinate system on a screen of the at least one client computer 4.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A system for positioning a coordinate system of a measurement machine in relation to a workpiece placed on the measurement machine, the system comprising:
    an element receiving module configured for receiving positioning elements in relation to the workpiece, wherein the positioning elements comprise the coordinate system of the measurement machine and feature elements which comprise a plane positioning element, an origin positioning element, and an axis positioning element, the plane positioning element being a plane, the origin positioning element being at least one point, and the axis positioning element being a plane, a point, a line, a circle, or a sphere, wherein the points, the lines, the planes, the circles, and the spheres are selected from the workpiece;
    a first axis vector determining module configured for determining a normal vector of a first axis of a positioned coordinate system according to a normal vector of the plane of the plane positioning element;
    an origin determining module configured for determining an origin of the positioned coordinate system according to an X coordinate value, a Y coordinate value, and a Z coordinate value of the at least one point of the origin positioning element;
    a second axis vector determining module configured for determining a normal vector of a second axis of the positioned coordinate system according to the axis positioning element, wherein if the axis positioning element is a line, the normal vector of the second axis of the positioned coordinate system is a normal vector of the line, and if the axis positioning element is a point, a plane, a circle, or a sphere, the normal vector of the second axis is a normal vector of a line composed of a center of the axis positioning element and the origin of the positioned coordinate system;
    a coordinate system positioning module configured for generating the positioned coordinate system according to the normal vectors of the first axis vector and the second axis, and the origin, to position the coordinate system of the measurement machine; and
    at least one processor that executes the elements receiving module, the first axis vector determining module, the origin determining module, the second axis vector determining module, and the coordinate system positioning module.

2. The system as described in claim 1, further comprising:
    a graph control module for loading the positioned coordinate system and outputting the positioned coordinate system onto a monitor of the system.

3. The system as described in claim 2, wherein the graph control module uses the Open Graphics Library (OpenGL) to load and output the positioned coordinate system onto the monitor.

4. A computer-implemented method for positioning a coordinate system of a measurement machine in relation to a workpiece placed on the measurement machine having the coordinate system, comprising:
    (a) receiving positioning elements in relation to the workpiece, wherein the positioning elements comprise the coordinate system of the measurement machine and feature elements which comprise a plane positioning element, an origin positioning element, and an axis positioning element, the plane positioning element being a plane, the origin positioning element being at least one point, and the axis positioning element being a plane, a point, a line, a circle, or a sphere, wherein the points, the lines, the planes, the circles, and the spheres are selected from the workpiece;
    (b) determining a normal vector of a first axis of a positioned coordinate system according to a normal vector of the plane of the plane positioning element;
    (c) determining an origin of the positioned coordinate system according to an X coordinate value, a Y coordinate value, and a Z coordinate value of the at least one point of the origin positioning element;
    (d) determining a normal vector of a second axis of the positioned coordinate system according to the axis positioning element, wherein if the axis positioning element is a line, the normal vector of the second axis of the positioned coordinate system is a normal vector of the line, and if the axis positioning element is a point, a plane, a circle, or a sphere, the normal vector of the second axis is a normal vector of a line composed of a center of the axis positioning element and the origin of the positioned coordinate system;
    (e) generating the positioned coordinate system according to the normal vectors of the first axis and the second axis, and the origin, for positioning the coordinate system; and
    (f) outputting the positioned coordinate system on a monitor of the system using a graph control module.

5. The method as described in claim 4, wherein the graph control module uses the Open Graphics Library (OpenGL) to load and output the positioned coordinate system onto the monitor.

6. The method as described in claim 4, wherein the first axis is a Z-axis, and the second axis is an X-axis or a Y-axis.

7. The method as described in claim 4, wherein block (b) further comprises:
    determining a normal vector of a first axis of a positioned coordinate system according to a normal vector of the Z axis of the coordinate system of the measurement machine upon the condition that the plane positioning element is not received.

8. The method as described in claim 4, wherein block (c) further comprises:

determining an origin of the positioned coordinate system according to the origin of the coordinate system of the measurement machine upon the condition that the origin positioning element is not received.

9. The method as described in claim 8, wherein block (d) further comprises:
   determining a normal vector of a second axis of the positioned coordinate system according to a normal vector of the X axis or the Y axis of the coordinate system of the measurement machine upon the condition that the axis positioning element is not received.

10. A storage medium having stored thereon instructions that, when executed by a processor, causing the processor to perform a method for positioning a coordinate system in relation to a workpiece placed on a measurement machine having the coordinate system, the method comprising:
   (a) receiving positioning elements in relation to the workpiece, wherein the positioning elements comprise the coordinate system of the measurement machine and feature elements which comprise a plane positioning element, an origin positioning element, and an axis positioning element, the plane positioning element being a plane, the origin positioning element being at least one point, and the axis positioning element being a plane, a point, a line, a circle, or a sphere, wherein the points, the lines, the planes, the circles, and the spheres are selected from the workpiece;
   (b) determining a normal vector of a first axis of a positioned coordinate system according to a normal vector of the plane of the plane positioning element;
   (c) determining an origin of the positioned coordinate system according to an X coordinate value, a Y coordinate value, and a Z coordinate value of the at least one point of the origin positioning element;
   (d) determining a normal vector of a second axis of the positioned coordinate system according to the axis positioning element, wherein if the axis positioning element is a line, the normal vector of the second axis of the positioned coordinate system is a normal vector of the line, and if the axis positioning element is a point, a plane, a circle, or a sphere, the normal vector of the second axis is a normal vector of a line composed of a center of the axis positioning element and the origin of the positioned coordinate system;
   (e) generating the positioned coordinate system according to the normal vectors of the first axis and the second axis, and the origin, for positioning the coordinate system; and
   (e) outputting the positioned coordinate system on a monitor using a graph control module.

11. The storage medium as described in claim 10, wherein the first axis is a Z axis, and the second axis is an X axis or a Y axis.

12. The storage medium as described in claim 10, wherein block (b) further comprises:
   determining a normal vector of a first axis of a positioned coordinate system according to a normal vector of the Z axis of the coordinate system upon the condition that the plane positioning element is not received.

13. The storage medium as described in claim 10, wherein block (c) further comprises:
   determining an origin of the positioned coordinate system according to the origin of the coordinate system upon the condition that the origin positioning element is not received.

14. The storage medium as described in claim 10, wherein block (d) further comprises:
   determining a normal vector of a second axis of the positioned coordinate system according to a normal vector of the X-axis or the Y axis of the coordinate system upon the condition that the axis positioning element is not received.

* * * * *